United States Patent
Lamb et al.

(10) Patent No.: US 11,109,197 B2
(45) Date of Patent: Aug. 31, 2021

(54) SHORT MESSAGE SERVICE FOR INTERNET DEVICES

(71) Applicants: Richard Lamb, Petaluma, CA (US); Eduard Guzovsky, Weston, MA (US)

(72) Inventors: Richard Lamb, Petaluma, CA (US); Eduard Guzovsky, Weston, MA (US)

( * ) Notice: Subject to any disclaimer, the term of this patent is extended or adjusted under 35 U.S.C. 154(b) by 431 days.

(21) Appl. No.: 16/271,813

(22) Filed: Feb. 9, 2019

(65) Prior Publication Data
US 2020/0260237 A1    Aug. 13, 2020

(51) Int. Cl.
| | |
|---|---|
| *H04L 29/12* | (2006.01) |
| *H04W 4/14* | (2009.01) |
| *H04L 29/08* | (2006.01) |
| *H04L 29/06* | (2006.01) |
| *H04W 12/03* | (2021.01) |
| *H04W 88/16* | (2009.01) |
| *H04W 84/12* | (2009.01) |

(52) U.S. Cl.
CPC ........... *H04W 4/14* (2013.01); *H04L 61/1511* (2013.01); *H04L 63/0485* (2013.01); *H04L 67/12* (2013.01); *H04W 12/03* (2021.01); *H04W 84/12* (2013.01); *H04W 88/16* (2013.01)

(58) Field of Classification Search
CPC ......... H04W 4/14; H04W 4/70; H04W 12/03; H04W 88/16; H04W 84/12; H04L 67/12; H04L 61/1511; H04L 63/0485; H04L 63/083; H04L 63/0435; H04L 69/08
See application file for complete search history.

(56) References Cited

U.S. PATENT DOCUMENTS

| | | | | |
|---|---|---|---|---|
| 10,581,875 | B2* | 3/2020 | Holland | H04B 1/3816 |
| 10,588,070 | B2* | 3/2020 | Schwengler | H04L 45/22 |
| 2013/0286942 | A1* | 10/2013 | Bonar | H04L 45/24 370/328 |
| 2014/0344917 | A1* | 11/2014 | Parla | H04L 45/74 726/15 |
| 2015/0188949 | A1* | 7/2015 | Mahaffey | H04W 12/37 726/1 |
| 2016/0087933 | A1* | 3/2016 | Johnson | H04L 67/34 709/245 |
| 2017/0134937 | A1* | 5/2017 | Miller | G06Q 20/3829 |
| 2017/0272316 | A1* | 9/2017 | Johnson | G06Q 10/103 |
| 2018/0191666 | A1* | 7/2018 | Rahman | H04L 61/1511 |

(Continued)

OTHER PUBLICATIONS

Florea et al, Survey of Standardized Protocols for the Internet of Things, 2017, IEEE, pp. 192-196 (Year: 2017).*

*Primary Examiner* — Samson B Lemma
*Assistant Examiner* — Abdullah Almamun

(57) ABSTRACT

A system that translates between Internet of Things (IoT) protocols and Internet name management protocols (domain name system—DNS) so as to allow the secure exchange of short messages through WiFi hotspots. Applications include but are not limited to remote configuration, control, tracking, telemetry, synchronization, emergency communication. The system is operated as an independent service or is integrated into hotspot or IoT management operations for public use or private use in an enterprise or home. The widespread installed base of hotspots, standardized IoT and DNS protocols allows the IoT ecosystem as a whole to immediately reap the benefits of greater communication capabilities.

3 Claims, 1 Drawing Sheet

(56) References Cited

U.S. PATENT DOCUMENTS

| | | | |
|---|---|---|---|
| 2018/0309658 A1* | 10/2018 | Parla | H04L 12/4641 |
| 2019/0089747 A1* | 3/2019 | Wang | H04L 9/0841 |
| 2019/0158353 A1* | 5/2019 | Johnson | H04L 61/2514 |
| 2019/0372937 A1* | 12/2019 | Song | H04L 63/029 |

* cited by examiner

SHORT MESSAGE SERVICE FOR INTERNET DEVICES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

BACKGROUND OF THE INVENTION

Field of the Invention

The present invention relates to the use of WiFi hotspot connections to provide rudimentary communication to the growing class of unattended Internet devices referred to as the Internet of Things (IoT). More particularly, the present invention relates to a system which acts as a gateway between IoT protocols and the Internet's intrinsic name management protocol, the Domain Names System (DNS), using it as a transport mechanism. By doing so, the present invention instantly brings the benefits of the wide deployment of WiFi hotspots and thus remote Internet connectivity to IoT—without the need for preconfiguring for specific WiFi access point credentials or maintaining subscriptions (e.g., Cellular) for each device. Applications include but are not limited to remote configuration, control, tracking, telemetry, synchronization, emergency communication.

BRIEF SUMMARY OF THE INVENTION

The key to the success of the Internet has been its open architecture allowing any device to connect and exchange information using open standards. With the continual reduction of hardware costs, connectivity to the Internet is being built into everything no matter how mundane. Conservative estimates suggest this Internet of Things (IoT) will grow to 20 Billion devices by 2020 [1]. However, configuring, managing and providing connectivity for each device presents a barrier to this growth.

The purpose of the present invention is to instantly simplify and expand connectivity options for the deployment of IoT devices by providing 1) a gateway between IoT protocols, DNS, WiFi hotspots; and 2) a secure, efficient, reliable protocol for transporting messages over DNS. To do this it makes use of the ability to use the DNS for transport [2]; a protocol between device and gateway to optimize and secure DNS transport; and bi-directional translation of device data in the gateway to conform to IoT protocols. The disparity between IoT and DNS protocols and their operational assumptions require careful crafting of gateway and protocol as well as taking into account the semantics and purpose of each IoT message during translation.

Currently, IoT devices must have their Internet connection manually configured before anything can be done with them. This typically requires the user to be in close proximity to the device to enter access point credentials in the case of WiFi, PIN codes in the case of Bluetooth. Cellular and other long range connectivity (e.g., LoRA, SigFox [3]) require setting up and maintaining paid subscriptions and credentials. When managing a large number of devices, updates to passwords or other credentials or subscriptions must be carefully considered due to physical accessibility and cost of failure. This per-device provisioning overhead represents a barrier to the growth of IoT. The present invention provides an alternative making use of already extensive WiFi hotspot coverage in urban areas [4] and a combined translator/gateway and protocol designed to securely communicate through generally open DNS channels. The intent is not to supplant existing means of communication provided by private access points (which can be simultaneously configured as hotspots) and subscription services but instead to provide a ubiquitous, short messaging channel for applications including but not limited to remote configuration, control, tracking, telemetry, synchronization, emergency communication at very low cost.

BRIEF DESCRIPTION OF THE SEVERAL VIEWS OF THE DRAWING(S)

DETAILED DESCRIPTION OF THE INVENTION

Figure 1:
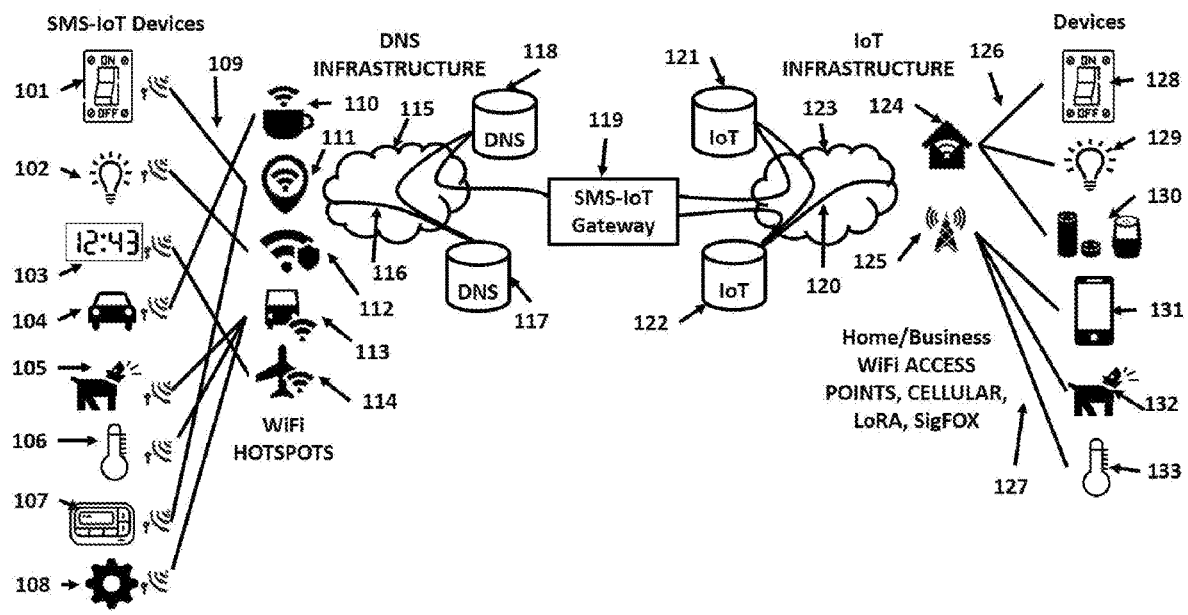
FIG. 1 shows a diagram of a preferred embodiment of the present invention as part of an overall system.
Figure 2:
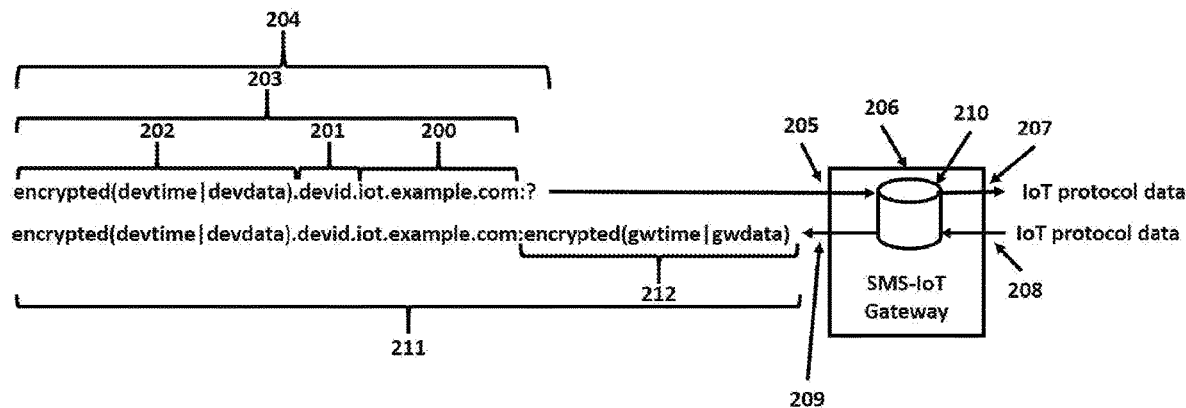
FIG. 2 shows a detailed view of the present invention protocol.

Using the DNS for rudimentary communication has been done before [2] and is currently used by some vendors to provide benign back channel/out-of-band communication to their products [5]. However, DNS tunneling, as this is often referred to, has not seen wide application in the IoT field due to protocol speed, payload size limitations, simplistic non-guaranteed delivery, and use cases. Although beyond the scope of the present invention, efforts are underway to further legitimize DNS tunneling through use of defensive mechanisms such as validation [6]. However, the present invention's combination of carefully designed tunneling (naming, timing, encryption, polling, re-transmission, fragmentation) with translation built into a single gateway make it directly applicable to the wide range of IoT devices that require short messages and low data rate. These include but are not limited to switches, door sensors, light bulbs (102), on/off sockets (101), thermostats, pagers (107), clocks (103), tracking devices (104, 105) (GPS assisted or based on current hotspot location [4]), sensor telemetry (106), as well as for remote device configuration (108) [7] and setting.

IoT devices employing the present invention (101-108) function as normal DNS clients periodically querying for domain names and processing responses. A feature of the DNS is that it remembers (caches) frequently requested results. Therefore, in order for a DNS request to reach the server responsible for a specific domain name (200) under the gateway's (119, 206) control, it is carefully crafted to embed data, changing time, and random numbers into the beginning (202) of the full domain name (203) to ensure that the query is one that has not been seen and responded to before by intermediate DNS servers. This prefix is also encrypted so that intermediate systems or eavesdroppers cannot discern actions or impersonate responses. An unencrypted device identifier (201) is added to aid per device information lookup such as passwords for subsequent decryption in the gateway. Management of these passwords is beyond the scope of the present invention but is envisioned to be handled by each device vendor who is responsible for their own IoT infrastructure currently. This scheme ensures that the full query (204) will be forwarded to the DNS server responsible (whose function is being performed by the gateway) for the base domain name (200). In the present invention this server appears as a normal DNS server accepting DNS queries but also decrypts the domain name prefix (202), checks the device time to ensure the data is fresh, uses the data to update device status in the local database (210). A DNS response (211) is generated reversing this process incorporating local time and data (212) from the database (210). Between queries, the database data may have been updated via the IoT protocol end of the gateway or by other devices on the DNS side. If the DNS request results in updates to the database (210) that warrant further dissemination, e.g., change device state, the gateway translates any changes into IoT protocols (207) such as Message Queuing Telemetry Transport (MQTT) [8] and sends them to operator defined "broker" servers (121, 122). These brokers keep track of device state, communicate on behalf of other devices, and provide access control. In order to minimize unnecessary Internet traffic, updates will not be translated and transmitted to brokers in cases where there is no need such as administrative "keep-alive" messages or those that do not indicate a change in device state. This allows the frequent DNS style request/response traffic to be isolated to the edges of the Internet, closer to devices implementing the present invention. Translation between limited DNS protocol data, e.g., less than 256 character name length; request/response nature; non-guaranteed delivery [9], and modern day protocols used in IoT (e.g., MQTT) is performed in the gateway using a operator defined table that maps the typically long descriptive IoT protocol "topic" names to much shorter representations than will fit in a DNS query or response.

On reception the broker (e.g. 121), determines which devices, on either side of FIG. 1 (101-108, 128-133), to communicate with regarding changes. The changes communicated by the device may refer to itself or a request to change the state on another device, e.g., a relay. Devices may be listening for changes on another device (e.g, switch state on 101) or listening for requested changes in its own state (e.g., turn relay on at 129). A device may act solely as management, e.g., if it receives "switch on at device 101" from the broker, then it sends a request to change the state of device 129 to "relay on" via the broker. In the reverse direction, a short message sent from cell phone (131) to pager (107) would travel via broker (121) to gateway (119) as a request to change a field on 107. At the next periodic DNS request/response from 107 to gateway, this message would be translated and picked up by 107 and displayed. Similarly, IoT devices employing the present invention (101-108) rely on the brokers to communicate between themselves.

In more detail, messages from devices (128-133) reach brokers (121, 122) where they determine if the gateway (119) has registered to receive any of the messages on behalf of IoT devices (101-108). If so, the broker sends them to the gateway where they update device information in the database (210). Then when devices (101-108) instigate their next DNS request, updated local status relevant for the device is translated, compressed, encrypted, and encapsulated into a normal DNS response (212). This DNS response is sent back to the requesting device via intermediate DNS systems (117, 118) and WiFi hotspots (110-114). At the device (101-108) the response is decrypted, the received time matched with the device's time, and data acted on (e.g., light on, light off, clock set). The running exchange of time stamps is used to synchronize devices and used to discard any duplicates while ensuring domain names queries make it through the DNS infrastructure. Since DNS is a request/response protocol, devices employing the present invention must send periodic requests to be apprised of any new data destined for them, typically every few seconds. This low data rate is fine for the vast majority of IoT devices (e.g., lights, switches, tracking, sensor telemetry, synchronization, configuration) but is not designed for high bandwidth devices producing video. The inherent architecture of the DNS permits the present invention to expand to handle any number of devices by distributing processing across DNS naming hierarchy by choosing different base domain names (200).

Preferred Embodiment

The preferred embodiment of the present invention consists of IoT devices (101-108) programmed with a specialized protocol using DNS for transport over WiFi (110-114). The devices start by searching for any non-encrypted hotspot (110-114) such as those found at cafes (110), ISP operated (111), those part of a captive portal requiring login (112), on public transport (113) or flights (114). Although the majority of these hotspots require login credentials in order to perform normal Internet tasks, Internet name management traffic or DNS does not require login. So small amounts of data in the form of periodic DNS queries (204) pass from devices (101-108) via WiFi hotspots (110-114) into the Internet (115) and travel (116) through various elements of the DNS (117, 118) to eventually reach the present invention gateway (119, 206) acting as the DNS server responsible for the base domain name (200). The encoding of DNS messages for IoT devices (101-108) and gateway (119, 206) form the present invention. In the preferred embodiment IoT devices (101-108) send requests no more than every 2 seconds which is sufficient for most low data rate IoT applications and keeps Internet utilization low. In a large scale deployment there would be multiple gateways (119, 206) logically close to hotspot connections to keep periodic request/response traffic local and therefore minimize backhaul Internet bandwidth utilization. In the preferred embodiment the actual DNS query type would be type "TXT" [9] as it allows an arbitrarily formatted response. On reception of a request over DNS at the gateway (205) the encrypted portion of the name (202) is decrypted with a key corresponding to a unique identifier for the device (201) looked up from database (210). The decrypted data is used to update device information in the database (210). A matching DNS response is then crafted with encrypted time stamp and relevant topics from the database—which may have been updated from independent communication with brokers (121, 122), formatted as a DNS TXT type response payload (212) and sent back via the same return path (209, 116, 117, 118, 110-114, 109) to IoT devices (101-108). On reception of the response the IoT device (101-108) decrypts the TXT type payload, matches time stamps, and acts on the data, e.g., update configurations, turn light on, set clock. If the request received by the gateway updates the database in such a way that warrants notifying other devices via the brokers (121, 122), i.e., a change in state, the relevant database (210) data is translated into an IoT protocol message via operator defined table and sent to operator defined brokers using the MQTT protocol (121, 122). The broker updates its state based on this information and if changes occurred for devices registered to receive updates, the broker communicates updates to these devices via private WiFi access points (124) to local IoT devices (128, 129) or applications such as voice recognition speakers (130); or via wide area technologies such as cellular (125) to smart phones (131), tracking devices e.g., on pet collars (132), or remote sensors collecting telemetry (133). Furthermore, since the brokers represent all devices, it is responsible for updating IoT devices 101-108 as well as 128-133. So the broker will send relevant updates from 101-108 back to the gateway, for "pick-up" by 101-108 on their next request/response exchange. The separation of roles between gateway and broker in the preferred embodiment, although inefficient in the above scenario is far outweighed by the ability to distribute Internet traffic to the edges.

As the WiFi devices must be configured for specific access points, they cannot be mobile and must remain in proximity to their respective access point. Furthermore, any updates to access point credentials must be carefully reflected (make before break) for remote or difficult to reach devices. Although IoT devices relying on wide area technologies may not suffer from these restrictions, subscriptions for each device must be paid for and maintained. The present invention has none of these restrictions. The bandwidth consumed by the present invention is miniscule (approximately 0.34%) compared to today's Internet traffic which is mostly video [10]. However, a profitable model to recover any additional costs incurred by hotspot operator would be to incorporate them into the IoT server fees device vendors pay now. Current IoT protocol devices rely on extensive back-end server infrastructure (120-122) whose operational costs are built into the purchase price of the device (estimate $0.23/year/device [11]). It is envisioned that sub-fractional bandwidth and minimal server requirement costs of the present invention can be similarly subsumed into the device purchase price as part of back end server operations. In one scenario, providing this additional service can be an additional revenue opportunity for ISPs supplying hotspot infrastructure. However, if the downward trend in incremental Internet costs for ISPs continues at its current rate (estimate similar $0.23/year/device [12]), the bandwidth required by the present invention can become inconsequential and simply offered as a differentiating service among competing ISPs.

REFERENCES

[1] Leading the IoT—Gartner www.gartner.com/imagesrv/books/iot/iotEbook_digital.pdf
[2] T. V. Leijenhorst. On the viability and performance of dns tunneling. ro.uow.edu.au/infopapers/3126/[3]
[3] NB-IoT vs. LoRa vs. Sigfox, low-power, wide-area network (LPWAN) technologies www.link-labs.com/blog/nb-iot-vs-lora-vs-sigfox
[4] Wigle.net map, Wireless Network Mapping wigle.net/map?maplat=34.798733613271956&maplon=-29.981137250000014&mapzoom=4&coloring=density
[5] Sophos Web Protection www.sophos.com community.sophos.com/products/endpoint-security-control/f/sophos-endpoint-software/8981/excessive-dns-lookups-from-sophosxl-net
[6] Combating Malicious DNS Tunnel arxiv.org/pdf/1605.01401.pdf
[7] Network Configuration Protocol (NETCONF) tools.ietf.org/html/rfc6241
[8] Message Queuing Telemetry Transport en.wikipedia.org/wiki/MQTT
[9] DOMAIN NAMES—IMPLEMENTATION AND SPECIFICATION tools.ietf.org/html/rfc1035
[10] Average Monthly Broadband Usage is 190 Gigabytes Monthly Per Household www.telecompetitor.com/igr-average-monthly-broadband-usage-is-190-gigabytes-monthly-per-household/Generous bandwidth estimate of present invention: 500 bytes every 2 seconds=0.65gbytes/mo=0.34% of avg household
[11] AWS IoT Core Pricing—Amazon Web Services aws.amazon.com/iot-core/pricing/[12]
[12] Does anyone know the actual cost to ISP of transferring 1Gig of data www.reddit.com/r/technology/comments/3s56rs/does_anyone_know_the_actual_cost_to_isp_of/ 0.65gbytes/mo at $0.03gbyte/mo=$0.0195/mo or $0.23/year

What is claimed:

1. A method for one or more devices to exchange short messages with Internet of Things (IoT) infrastructure via one or more WiFi hotspots without the need for login to the one or more WiFi hotspots using the domain name system (DNS) for transport, the method comprising:
    encoding a message with a device timestamp and random data into a unique DNS request;
    the unique DNS request sent from a device via a WiFi hotspot to a DNS infrastructure where a prior login into the WiFi hotspot is not necessary;
    the unique DNS request being forwarded by the DNS infrastructure to a gateway device;
    the gateway device decoding the unique DNS request, validating the message and the device timestamp and dropping duplicate, stale or malformed requests;
    using the message encoded in the unique DNS request to update a device information in a database;
    sending a DNS response with a gateway timestamp and the updated device information relevant to the device encoded into a DNS response payload;
    translating the updated device information in the database into an IoT protocol message and
    transmitting the IoT protocol message to servers, IoT devices, and applications that are part of the IoT infrastructure;
    the gateway receiving messages from the IoT infrastructure and updating the database with data related to the IoT infrastructure, wherein, the data is used in formulating subsequent DNS and IoT infrastructure responses;
    responding to one or more requests from the IoT infrastructure with the updated device information from the database.

2. The method of claim 1, further comprising encryption of message, timestamp and random data prior to encoding into a unique DNS request to protect message from modification and eavesdropping.

3. The method of claim 2, where the gateway device is built into one or more WiFi hotspots or the IoT infrastructure.

* * * * *